United States Patent [19]

Takamatsu et al.

[11] Patent Number: 4,825,079
[45] Date of Patent: Apr. 25, 1989

[54] PYROELECTRIC INFRARED DETECTOR

[75] Inventors: Keiji Takamatsu; Hideki Takahashi, both of Ichikawa, Japan

[73] Assignee: Sumitomo Metal Company Limited, Tokyo, Japan

[21] Appl. No.: 55,122

[22] Filed: May 28, 1987

[30] Foreign Application Priority Data

May 30, 1986 [JP] Japan ................... 61-125332

[51] Int. Cl.$^4$ .................................. G01J 5/00
[52] U.S. Cl. ................... 250/338.3; 250/342
[58] Field of Search ............ 250/338 PY, 338 R, 342

[56] References Cited

U.S. PATENT DOCUMENTS 4,214,165 7/1980 Asawa ........................... 250/340
4,542,294 9/1985 Tamura et al. ................. 250/349
4,626,687 12/1986 Nara et al. ..................... 250/370 R Primary Examiner—Carolyn E. Fields
Assistant Examiner—John A. Miller
Attorney, Agent, or Firm—Watson, Cole, Grindle & Watson

[57] ABSTRACT

A pyroelectric infrared detector for use in, for example, an intrusion alarming system has a pyroelectric element, a FET for picking up the output of the pyroelectric element, a capacitor connected in parallel to the pyroelectric element, and other circuit parts. These constituent parts are integrally packed in a package.

8 Claims, 4 Drawing Sheets

PYROELECTRIC INFRARED DETECTOR

BACKGROUND OF THE INVENTION

1. Field of the Invention

The present invention relates to pyroelectric infrared detectors having decreased noise levels without reduction in the responsiveness of the pyroelectric infrared detector.

2. Description of the Prior Art

Pyroelectric infrared detectors (referred to as "pyroelectric detector" herein) are roughly sorted into two types depending on the method for picking up output from pyroelectric element: namely, a first voltage mode type and a second current type. In most uses, however, the pyroelectric detector is used in the voltage mode. The present invention is concerned with an improvement in the voltage circuit mode. There are three basic types of internal circuit of the pyroelectric detector, as shown in FIGS. 4(a) to 4(c). More specifically, FIG. 4(a) shows a single type pyroelectric element in which one of the electrodes of a single pyroelectric element is connected to the gate of a FET 3. This is the basic form of the voltage mode pyroelectric detector. A reference numeral 2 denotes a resistor having a high electric resistance on the order of $1 \times 10^9$ to $1 \times 10^{12} \Omega$. The resistor 2 serves as a leak resistor which prevents saturation of the gate of the FET 3 in the event of an excessive input to the detector. The resistor 2, however, may be omitted because the pyroelectric element 1 itself serves as a leak resistor when the resistance value of the pyroelectric element ranges between $10^9$ and $10^{12} \Omega$. FIG. 4(b) shows a pyroelectric detector generally referred to as dual type or twin type. This type of detector employs a composite pyroelectric element 4 composed of a pair of pyroelectric elements 1,1' having opposite polar directions and connected in series to each other. In this pyroelectric detector, only one of the pyroelectric elements 4 receives infrared rays. This arrangement effectively negates any erroneous signal which may otherwise be caused by vibration or fluctuation in the ambient temperature so that the error signal is not transmitted externally. Thus, this type of pyroelectric detector is suitable for use in the cases where a specifically high reliability is required, e.g., in an intrusion alarm.

Still another type of pyroelectric detector is shown within the broken lines in FIG. 4(c). In this pyroelectric detector, the source terminal of the FET 3 is connected to the voltage reference point so that signal output is derived from the drain terminal. This circuit enables the bias point of the output terminal to be set freely by suitable selection of the drain resistance 5, even when the leak resistor 2 is not provided. It is, therefore, possible to avoid any malfunction of the detector attributable to the saturation of the FET 3 in the event of an excessively large input to the detector. Since the pyroelectric element 1 has a high impedance on the order of $10^{11}$ to $10^{13} \Omega$, the FET 3 provides impedance conversion for converting the generated signal into a signal of low impedance.

The performance of the pyroelectric detector can be evaluated in terms of voltage responsivity and noise level. The factors of the voltage sensitivity and the noise will be described hereinunder.

According to E. H. Putley, Semiconductors and Semimetals (edited by Willardson) 5, p 259, Academic Press (1970)), the level of the voltage responsivity is expressed by the following formula:

$$R_v = \eta \cdot \omega \cdot A \cdot R/G \cdot dP_s/dT \cdot 1/\sqrt{1+\omega^2 \tau_T^2} \cdot 1/\sqrt{1+\omega^2 C^2 R^2} \tag{1}$$

where, $\eta$ represents the radiation factor, $\omega$ represents the chopping angular frequency ($=2\pi f$, f being chopping frequency), A represents area of light-receiving electrode of element, G represents radiative conductance, $dP_s/dT$ represents pyroelectric coefficient, $\tau_T$ represents thermal time constant ($=H/G$, H being heat capacity), C represents equivalent input capacitance of the detector, and R represents the equivalent input resistance.

The equivalent input capacitance C and the equivalent input resistance R are considered as being the synthetic values of the capacitances and resistance values of the pyroelectric elements 1,4, leak resistor 2 and the FET 3. Practically, however, the equivalent input capacitance C is substantially the same as the capacitance of the element, while the equivalent input resistance R is substantially the same as the leak resistor.

The noise of the pyroelectric detector also has a plurality of factors. These factors are, for example, temperature noise caused by the fluctuation in the ambient temperature, tan $\delta$ noise attributable to the dielectric loss of the pyroelectric element, input resistance noise (referred to also as Johnson noise) caused by the input resistor R, FET noise caused by gate leak current of the FET and FET voltage noise. The level of the noise of the pyroelectric detector is determined as the square mean of these factors. The inventors have made an intense study to analyze the effects of the respective factors and found that the input resistance noise is most dominant and the FET current noise comes next. It has thus proved that the noise of the pyroelectric resistor can satisfactorily be discussed only on the basis of these two types of noise factor. The level of the noise, therefore, can practically be expressed by the following formula.

$$V_N = \left( \frac{4kTR + i_n^2 R^2}{1 + \omega^2 C^2 R^2} \right)^{\frac{1}{2}} \tag{2}$$

where, k represents Boltzmann's constant, T represents the absolute temperature and $i_n$ represents the FET leak current.

Obviously, it is preferred that a pyroelectric detector has a responsivity which is as high as possible and a noise level which is as low as possible. Practically, however, it is quite difficult to attain a design which satisfies both these demands. Therefore, it has been a conventional measure that either one of these demands is satisfied preferentially while the other is obliged to be compromised. More specifically, effort has been concentrated to the enhancement of the responsivity, rather than to the reduction of the noise level. Namely, noise has been accepted as being unavoidable, provided that it can suitably be processed. In recent years, however, there is an increasing demand for reduction of the noise to a level below a predetermined limit, in order to cope with the current trend for sophistication of various appliances in this field.

From the formula (2) mentioned before, it is understood that the noise can be reduced by adopting large values for the equivalent input capacitance C and the equivalent input resistance R, while using a FET having a small level of leak current $i_n$. Thus, if the FET is given, only the factors C and R are selectable. The factors C and R are the equivalent capacitance and the equivalent resistance as viewed from the output side of the pyroelectric detector which is composed of the pyroelectric elements 1,4, leak current 2 and FET 3. Practically, however, the factor C is determined by the capacitance of the pyroelectric elements 1,4 which in turn is determined by the dielectric constant $\epsilon_r$, thickness of the element and the area of the electrode. Similarly, the factor R is materially determined by the resistance value of the leak resistor 2. From the viewpoint of reduction in the noise level, the equivalent input resistance R is preferably made as high as possible. The resistance value of the leak resistor R, however, cannot be increased unlimitedly because the leak resistor 2 has to leak electrode charge in the event of an excessively large input, in order to prevent saturation of the FET. Thus, in the practical pyroelectric detector, the upper limit of the resistance value of the leak detector R is selected to be about $5 \times 10^{11} \Omega$. In regard to the capacitance C, it is to be noted that no proposal has been made up to now for controlling the capacitance C for the purpose of reducing the noise level. The reason why such a proposal has not been made is that the control of the capacitance C leads to a reduction in the responsivity. As will be seen from formula (1), the voltage responsivity $R_v$ is decreased substantially in inverse proportion to the capacitance C. In other words, it is essential that the capacitance component of the pyroelectric element be reduced for the purpose of increasing the responsivity of the pyroelectric detector. In the conventional design of pyroelectric detectors, therefore, effort has been focused on the reduction of the capacitance component other than the capacitance component of the pyroelectric element itself. Thus, no approach has been made to the reduction in the noise through a control of the capacitance component, and attempts for reducing the noise in pyroelectric detectors have relied only upon the control of the resistance value of the leak resistor 2. In consequence, there has been a practical limit in the reduction in the noise level.

Another method for reducing the noise level is to select and use a FET having small leak current value $i_n$. This effectively reduces the term of the current noise in formula (2). Such a FET, however, is generally expensive and, in addition, has an inferior signal transmission efficiency which is as low as about 50 to 60% of the FET of ordinary specification. Thus, the use of such a FET seriously reduces the sensitivity when used in a pyroelectric detector, i.e., reduces the S/N ratio (signal to noise ratio) undesirably. In addition, it has been almost impossible to control the noise to a desired level.

Under these circumstances, the present inventors have made an intense study in order to develop a pyroelectric detector which is improved to reduce the noise level without being accompanied by any deterioration in the responsivity, by throughly reviewing the conventional concept in this field of technology.

SUMMARY OF THE INVENTION

Accordingly, an object of the present invention is to provide a pyroelectric detector which is improved in such a way as to reduce the noise level without causing the responsivity to be deteriorated.

As a result of the study, the present inventors have unexpectedly found that, even when the capacitance component C of the internal circuit of the detector is intentionally increased to reduce the responsivity, the S/N ratio of the pyroelectric detector is not changed substantially. Thus, the present inventors have succeeded in achieving the above-mentioned object of the invention by increasing, despite the common understanding that any increase in the capacitance C causes unfavourable effect on the responsivity, the capacitance C of the pyroelectric detector.

According to the present invention, there is provided a pyroelectric detector in which a capacitor is connected in parallel with a pyroelectric element and this parallel connection is integrally accommodated in a T0-5 metal package or a plastic package together with a leakage resistor and a FET.

The above and other objects, features and advantages of the present invention will become clear from the following description of the preferred embodiment when the same is read in conjunction with the accompanying drawings.

BRIEF DESCRIPTION OF THE DRAWINGS

FIGS. 4(a), 4(b), 4(c) and 4(d) are illustrations of known circuits.

DESCRIPTION OF THE PREFERRED EMBODIMENTS

The invention will be described hereinunder with reference to the accompanying drawings.

Figure 1A:
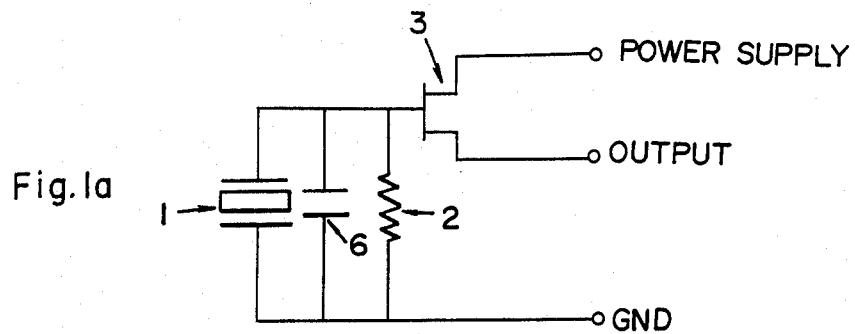
FIGS. 1(a), 1(b) and 1(c) are circuit diagrams of circuits incorporated in the first, second and third embodiments of the present invention.
Figure 1B:
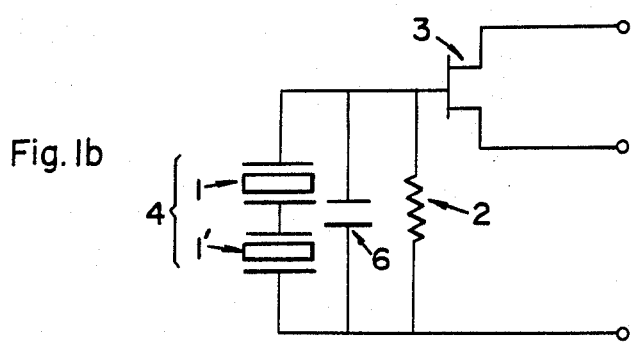
Figure 1C:
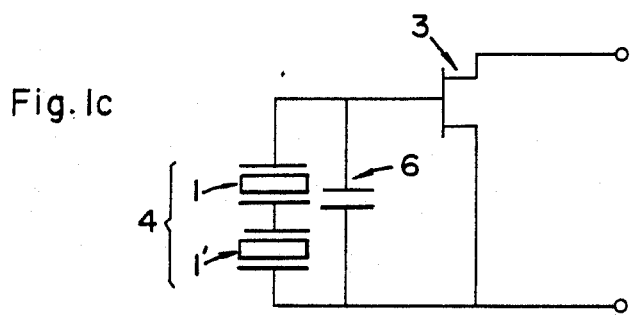

FIGS. 1(a) to 1(c) show first to third embodiments of the present invention. In these Figures, a reference numeral 6 denotes a capacitor which is connected in parallel to a pyroelectric element 1 or a composite pyroelectric element 4. These parts are accomodated, together with other circuit elements such as a leakage resistor 2 and a FET 3, in a T0-5 metal package or a plastic package. There is no limit in the capacitance of the capacitor 6, but the dielectric loss of this capacitor peferably should not be greater than 0.01 as measured at room temperature at 100 Hz. It is true that any resistor such as the leakage resistor 2, when formed on an alumina substrate by a thick-film printing, causes a parasitic capacitance more or less particularly when the distance between the electrodes is small, so that a capacitor of a small capacitance with a large dielectric loss is seemingly formed. With such a capacitor, however, it is not possible to effect accurate control.

Figure 2:
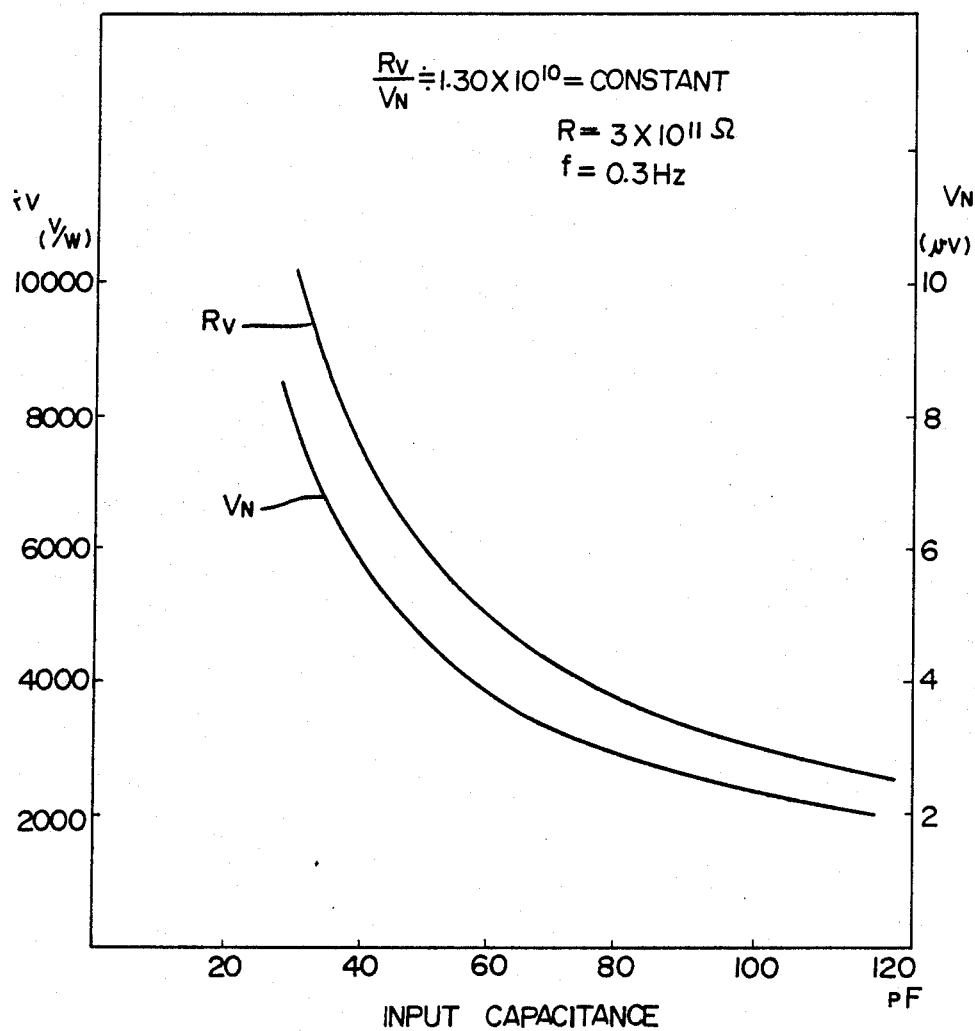
FIG. 2 is a graph illustrating changes in the voltage responsivity $R_v$ and $V_N$ in relation to a change in the input capacitance C in an infrared pyroelectric detector.

FIG. 2 is a graph showing the values of the voltage responsivity $R_v$ shown in the formula (1) and the noise $V_N$ shown in formula (2) theoretically calculated by selecting the chopping frequency at a level of 0.3 Hz, in relation to the capacitance C. The sensitivity in the low frequency region such as f=0.3 Hz is critical for enabling a very slow motion of, for example, an intruder in the case of an intrusion alarm. For the purpose of computing the voltage responsivity $R_v$, constants are employed in the formula (1) such as $\eta = 0.95$, $A = 0.02$ cm$^2$, $G = 2.51 \times 10^{-3}$ (J/K sec), $\eta_T = 0.25$ sec, $dP_s/dT = 4.4 \times 10^{-8}$ (C/cm$^2$ K) and $R = 3 \times 10^{11} \Omega$. On the other hand, the calculation of the noise is conducted by employing, in the formula (2), constants such as $i_n=3.6\times10^{-16}$ Amp/Hz and T=198K. These conditions approximate the case of so-called dual type pyroelectric detector shown in FIG. 1(b) which makes use of lead zirconate titanate (PZT) as the pyroelectric material. The capacitance as viewed from the output side without connecting the capacitor 6 is about 35 pF. Thus, the detector designed under the above-mentioned condition can realize the condition of C equals 35 pF in FIG. 2. As will be clearly seen from FIG. 2, both $R_v$ and $V_N$ are decreased as the value of C is increased. However, it has been found that the S/N ratio of the pyroelectric detector is not substantially changed but maintained substantially at the constant level of $1.30\times10^{10}$ even when the capacitance C is changed. This result of the theoretical calculation has been confirmed also through experiment. Thus, it has been confirmed that any increase in the capacitance component C does not impair substantially the final performance of the pyroelectric detector, i.e., the S/N ratio. Therefore, when it is desired to maintain the noise of the pyroelectric device at a low level due to the requirement of an amplifier circuit connected to the pyroelectric detector, it is possible to freely adjust the noise level by connecting a capacitor of a suitable level in parallel to the pyroelectric element.

The capacitance $C_2$ of the capacitor 6 to be coupled is determined by $C_2=C-C_1$, where $C_1$ represents the capacitance of the pyroelectric element 1 or the composite pyroelectric element 4 (in case of the dual type, composite capacitance produced by two elements connected in series). For instance, when the capacitance $C_1$ of the pyroelectric element is given as $C_1=35$ pF, the value of the noise is about 6.6 μV. It is possible to reduce the noise level to about a half by connecting a capacitor 6 of 33 pF in parallel to the pyroelectric element 1 or the composite pyroelectric element 4 so as to create the capacitance of C=68 pF.

There is no limit in the kind of the capacitor 6 used, but the capacitor 6 is preferably small in size and can be attached as closely as possible to the pyroelectric element 1 or the composite pyroelectric element 4. Practical examples of the capacitor 6 are chip-type capacitors which make use of mica or ceramics as the dielectric material. The effect produced by the capacitor 6 connected in parallel to the element 1 or 4 is the same in all the embodiments shown in FIGS. 1(a), 1(b) and 1(c).

Figure 3:
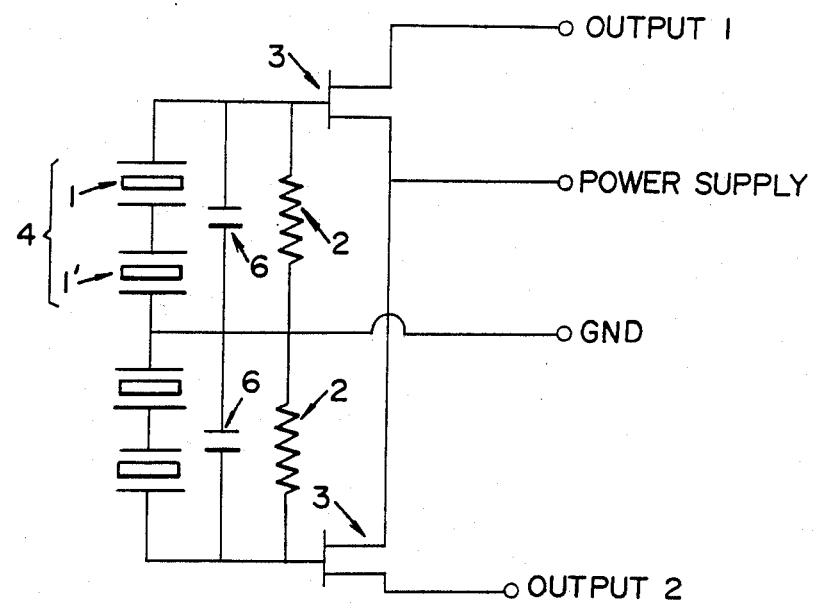
FIG. 3 is a circuit diagram of a fourth embodiment.
Figure 4A:
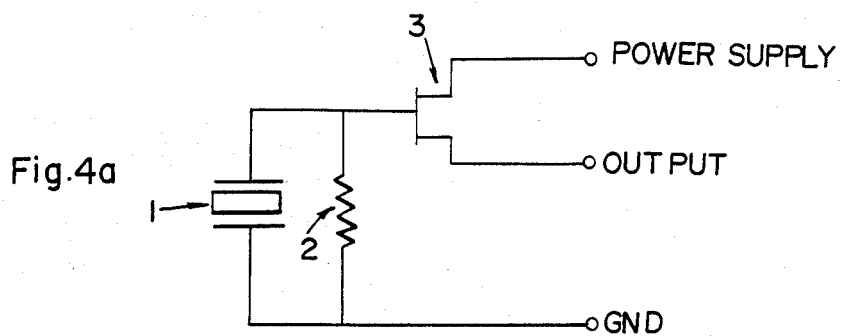
Figure 4B:
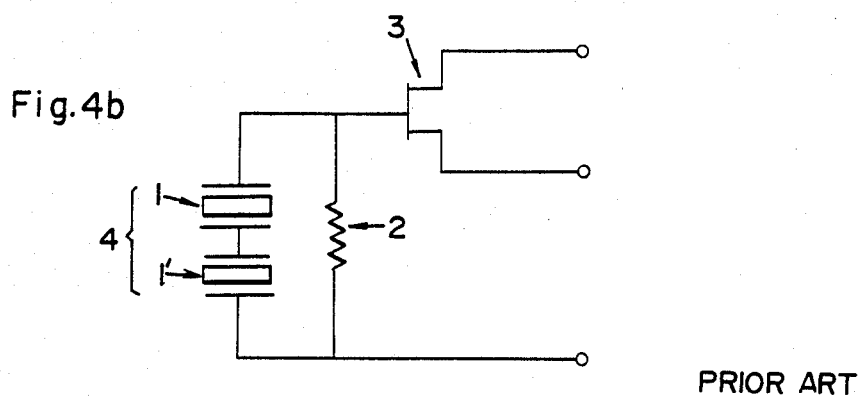
Figure 4C:
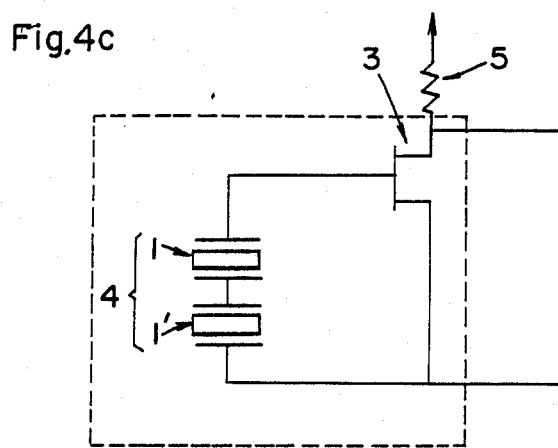

FIG. 3 shows a fourth embodiment of the present invention which incorporates a circuit composed of two pyroelectric detectors of dual type and accommodated in a single package. This embodiment offers the same advantage as those produced by the embodiments described before and, obviously, falls within the scope of the present invention.

What is claimed is:

1. A pyroelectric infrared detector, comprising a pyroelectric element and a FET for picking up the output of said pyroelectric element, a capacitor connected in parallel to said pyroelectric element, and a package in which at least said pyroelectric element and said capacitor are accommodated integrally.

2. A pyroelectric infrared detector according to claim 1, wherein said package is a TO-5 metal package.

3. A pyroelectric infrared detector according to claim 1, wherein said package is a plastic package.

4. A pyroelectric infrared detector according to claim 1, further comprising a leak resistor.

5. A pyroelectric infrared detector according to claim 1, wherein said capacitor has a dielectric loss not greater than 0.01 as measured at 100 Hz and at room temperature.

6. A pyroelectric infrared detector according to claim 1, wherein said capacitor is a chip-type capacitor.

7. A pyroelectric infrared detector according to claim 1, wherein the dielectric material of said capacitor is at least one of mica and ceramics.

8. A pyroelectric infrared detector according to claim 1, wherein the capacitance $C_2$ of said capacitor is determined by the following formula:

$$C_2=C-C_1$$

where C represents the equivalent input capacitance of the detector, while $C_1$ represents the capacitance of said pyroelectric element.

* * * * *